US012674530B2

(12) United States Patent
Jeng

(10) Patent No.: US 12,674,530 B2
(45) Date of Patent: Jul. 7, 2026

(54) PIPE JOINT ASSEMBLIES

(71) Applicant: DAOZ International Holding Limited, Wan Chai (HK)

(72) Inventor: Sheng-Hun Jeng, HsinChu (TW)

(73) Assignee: DAOZ INTERNATIONAL HOLDING LIMITED, Wan Chai (HK)

( * ) Notice: Subject to any disclaimer, the term of this patent is extended or adjusted under 35 U.S.C. 154(b) by 0 days.

(21) Appl. No.: 18/953,475

(22) Filed: Nov. 20, 2024

(65) Prior Publication Data

US 2026/0139770 A1 May 21, 2026

(51) Int. Cl.
*F16L 19/02* (2006.01)
*F16L 19/00* (2006.01)

(52) U.S. Cl.
CPC ......... *F16L 19/0206* (2013.01); *F16L 19/005* (2013.01); *F16L 19/0218* (2013.01)

(58) Field of Classification Search
CPC . F16L 19/005; F16L 19/0206; F16L 19/0218; F16L 17/067; F16L 17/073
See application file for complete search history.

(56) References Cited

U.S. PATENT DOCUMENTS

| | | | | |
|---|---|---|---|---|
| 2,050,137 | A * | 8/1936 | Walsh | F16L 19/0218 |
| 6,623,047 | B2 * | 9/2003 | Olechnowicz | F16L 19/005 |
| 11,774,015 | B2 * | 10/2023 | Harada | F16L 19/025 |
| 2014/0374122 | A1 * | 12/2014 | Fanguy | F16L 19/025 |
| 2018/0299042 | A1 * | 10/2018 | Ishibashi | F16L 19/0218 |

FOREIGN PATENT DOCUMENTS

JP     2019178689  A  * 10/2019

* cited by examiner

*Primary Examiner* — Zachary T Dragicevich

(74) *Attorney, Agent, or Firm* — MUNCY, GEISSLER, OLDS & LOWE, P.C.

(57) ABSTRACT

A pipe joint assembly comprises a gasket and two pipes. The gasket is flexible and has a through hole. Each pipe has a terminal connecting the gasket. Each terminal has a set of grooves and protrusions on a connecting surface to fit the sets on two sides of the gasket. Cross sections of protrusions are isosceles trapezoid.

17 Claims, 10 Drawing Sheets

130

P
G

140

142

144

150

152

154

156

159

158

PIPE JOINT ASSEMBLIES

FIELD

The present application relates to pipe joint assemblies or connectors, and more particularly to those used for transporting fluid such as chemical solution, water or the like.

BACKGROUND OF THE INVENTION

The transportation of chemical solutions or water are required in many manufacturing processes, for example, when a pharmaceutical factory produces drugs, or when a semiconductor factory coats the surface of a wafer to form a film of uniform thickness. Therefore, pipes and the connectors for pipes are required for many industries.

However, as factories and machines become more sophisticated, the space available for installing and replacing pipes becomes smaller and smaller. Therefore, there is the lack of space to allow the movement of a pipe to be inserted into or pulled out of the connector. Therefore, there is a requirement for a new pipe joint assembly to solve such problem. For example, PFA (Perfluoroalkoxy) pipes are popular in production of chemical, pharmaceutical, food, and semiconductor, and the traditional PFA pipe joints require special processes, and the quality of the construction affects its service life and the stability. Further, when two PFA pipes are connected during the installation process, displacement space in the direction parallel to the pipe is required to allow a pipe to be inserted into or pulled out of a connector. The lack of space will cause the difficulty to disassemble and assemble the pipe joint assembly, and the pipes cannot be removed from the joint during the installation and maintenance. If a pipe is installed forcibly, other connected pipes may be pulled or pushed violently to be damaged. Moreover, a hot air gun, expander, cleaning cloth, water, protective glasses, etc. are required to cut the PFA pipe, heat the PFA, and then insert the expander. This traditional installation is time-consuming, laborious and costly.

SUMMARY OF THE INVENTION

The traditional pipe joint assembly requires space to allow a pipe inserted into or pulled out of a connector in a direction parallel to the pipe. The pipe joint assembly of the present disclosure solve the problem of the lack of space with a structure allowing connecting pipes in a direction perpendicular to the pipes.

One aspect of the present disclosure provides a pipe joint assembly comprising a gasket, a first pipe, a second pipe, a bushing, a sleeve. The gasket has a through hole and is flexible. The first pipe has a first terminal connecting the gasket. The second pipe has a second terminal connecting the gasket. The bushing contains and holds the second pipe. The sleeve contains and holds the first pipe and the bushing.

Another aspect of the present disclosure provides a pipe joint assembly comprising a gasket, a first pipe and a second pipe. The gasket has a through hole and is flexible. The first pipe has a first terminal connecting the gasket. The second pipe has a second terminal connecting the gasket. The first terminal has a first set of grooves and protrusions on a first connecting surface. The second terminal has a second set of grooves and protrusions on a second connecting surface. The gasket has a third set of grooves and protrusions on a side to fit the first set of grooves and protrusions, and a fourth set of grooves and protrusions on another side to fit the second set of grooves and protrusions. Cross sections of the grooves and protrusions of the first set, the second set, the third set, and the fourth set are isosceles trapezoid.

Another aspect of the present disclosure provides a pipe joint assembly comprising a gasket, a first pipe and a second pipe. The gasket has a through hole and is flexible. The first pipe has a first terminal connecting the gasket. The second pipe having a second terminal connecting the gasket. The first terminal has a first set of grooves and protrusions on a first connecting surface. The second terminal has a second set of grooves and protrusions on a second connecting surface. The gasket has a third set of grooves and protrusions on a side to fit the first set of grooves and protrusions, and a fourth set of grooves and protrusions on another side to fit the second set of grooves and protrusions. The grooves or protrusions of the first set, the second set, the third set, or the fourth set have notches to leave space between the gasket and the first pipe or the second pipe.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF DRAWINGS

A more complete understanding of the present disclosure may be derived by referring to the detailed description and claims when considered in connection with the example embodiments shown in the drawings, in which:

DETAILED DESCRIPTION OF THE INVENTION

Figure 1:
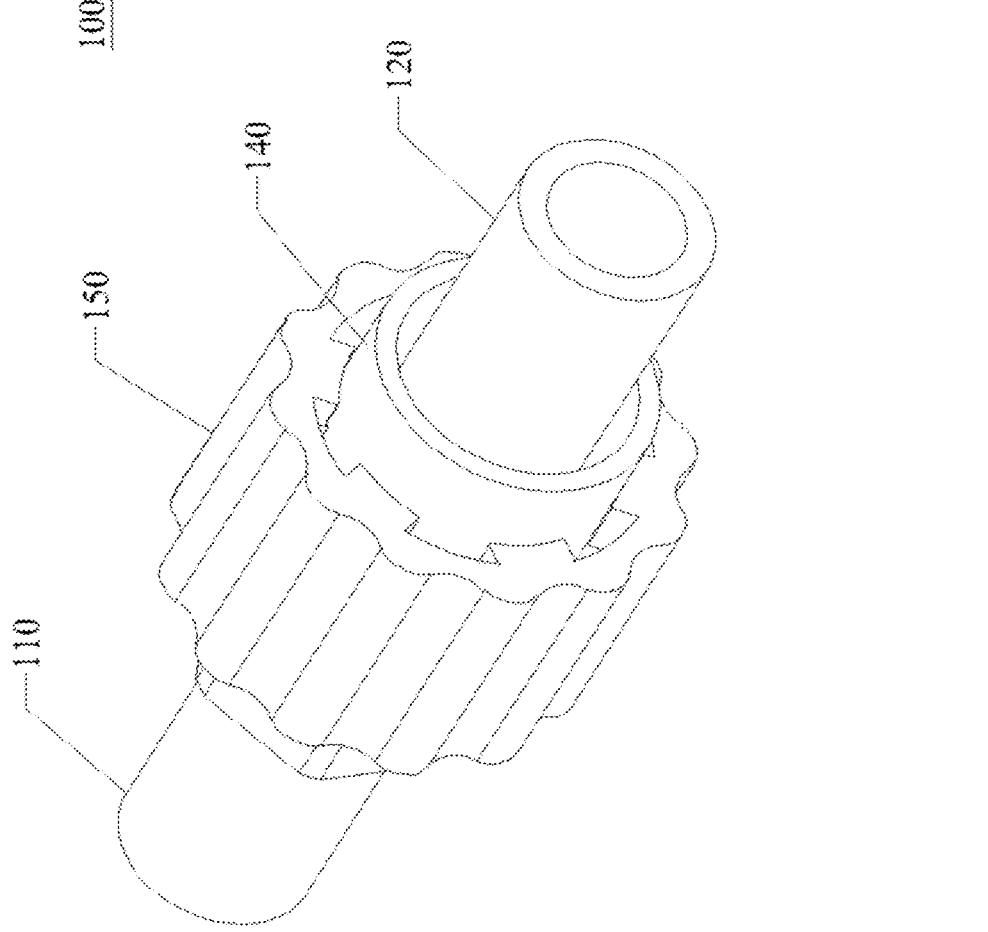
FIG. 1 is a perspective view of an pipe joint assembly according to an embodiment of the present disclosure.

Embodiments, or examples, of the disclosure illustrated in the drawings are now described using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral. It shall be understood that, although the terms first, second, third, etc. may be used herein to describe various elements, components, regions, layers or sections, these elements, components, regions, layers or sections are not limited by these terms. Rather, these terms are merely used to distinguish one element, component, region, layer or section from another region, layer or section. Thus, a first element, component, region, layer or section discussed below could be termed a second element, component, region, layer or section without departing from the teachings of the present inventive concept. The terminology used herein is for the purpose of describing particular example embodiments only and is not intended to be limited to the present inventive concept. As used herein, the singular forms "a," "an" and "the" are intended to include the plural forms as well, unless the context clearly indicates otherwise. It shall be further understood that the terms "comprises" and "comprising," when used in this specification, point out the presence of stated features, integers, steps, operations, elements, or components, but do not preclude the presence or addition of one or more other features, integers, steps, operations, elements, components, or groups thereof.

A pipe joint assembly according to an embodiment of the present disclosure will be described with reference to the drawings. The present invention will be described in detail below with reference to the accompanying drawings. As used herein, the element "pipe" is intended to include "tubing" as well.

Figure 2:
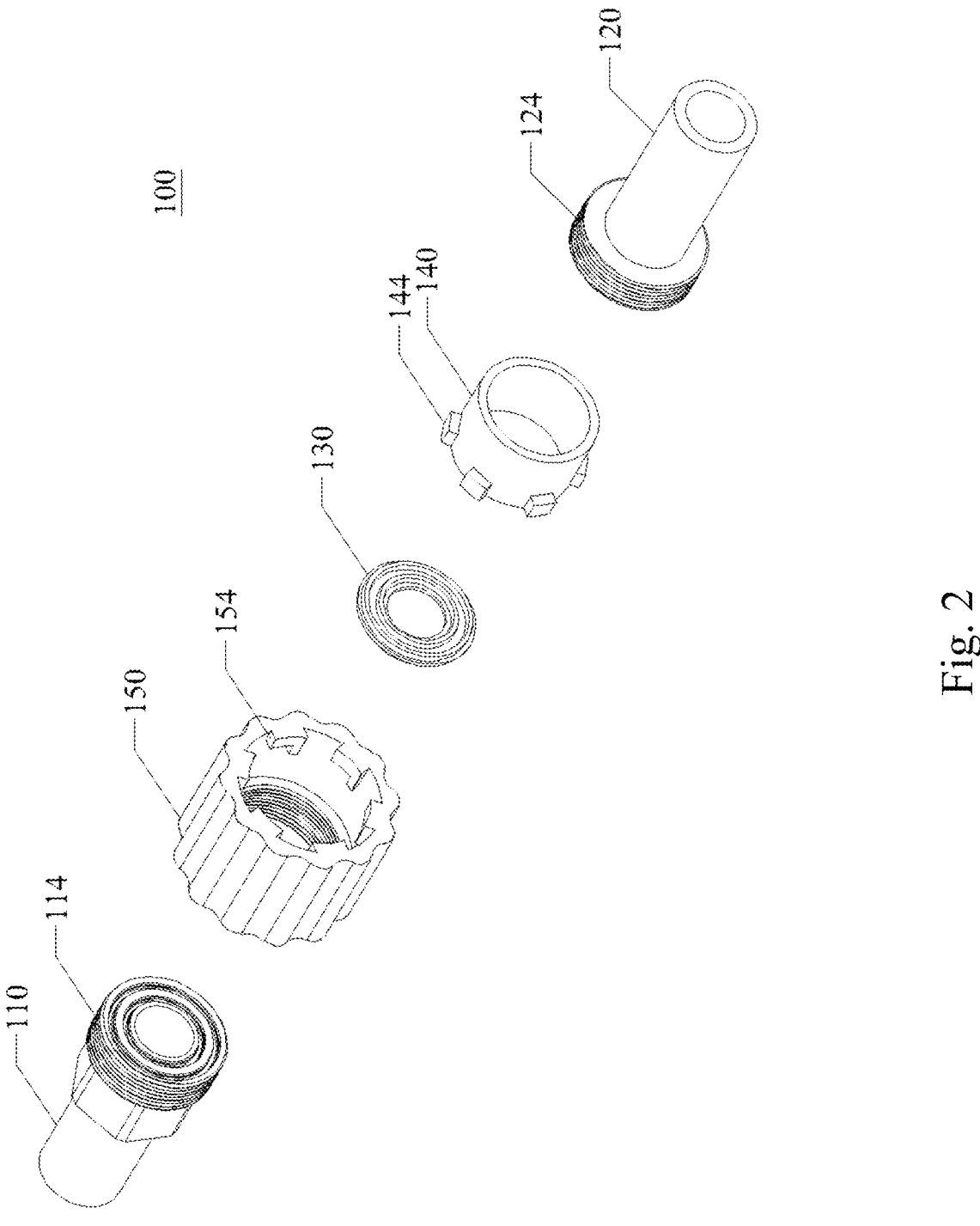
FIG. 2 is an exploded view of the assembly in FIG. 1 including a sleeve, a bushing, a gasket and pipes.

FIG. 1 is a perspective view of a pipe joint assembly 100 according to an embodiment of the present disclosure, and FIG. 2 is an exploded view of the pipe joint assembly 100 in FIG. 1 including a first pipe 110, a second pipe 120, a gasket 130, a bushing 140, and a sleeve 150. The gasket 130 has a through hole and the gasket 130 is flexible.

Figure 3:
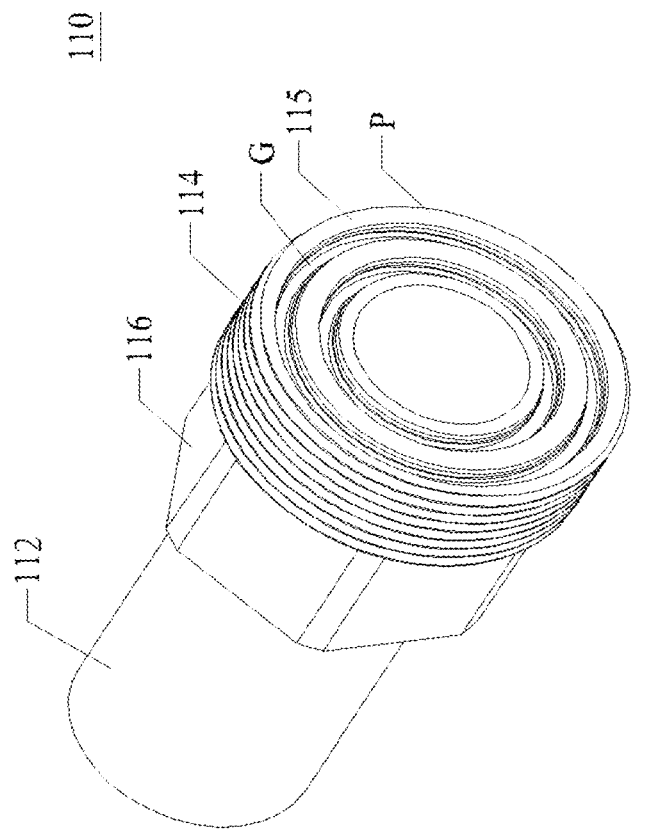
FIG. 3 is a perspective view of a pipe in FIG. 2.

FIG. 3 is a perspective view of the first pipe 110 in FIG. 2. The first pipe 110 has a pipe part 112 and a first terminal 114 for connecting the gasket 130. The first pipe 110 has a polygon section 116 near the first terminal 114. The first terminal 114 has a first set of grooves G and protrusions P on a first connecting surface 115.

Figure 4:
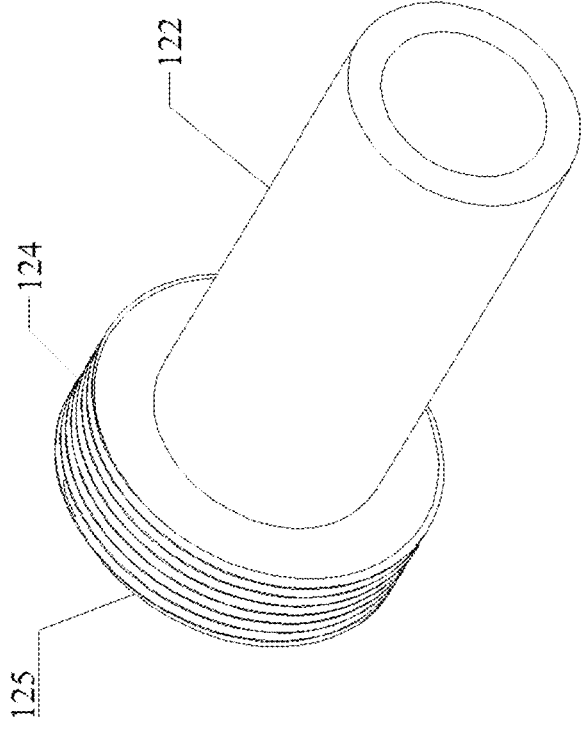
FIG. 4 is a perspective view of another pipe in FIG. 2.

FIG. 4 is a perspective view of the second pipe 120 in FIG. 2. The second pipe has a pipe part 122 and a second terminal 124 for connecting the gasket 130. The second terminal 124 has a second set of grooves and protrusions on a second connecting surface 125.

Figure 5:
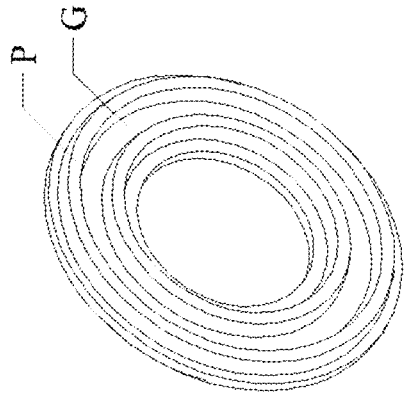
FIG. 5 is a perspective view of a gasket in FIG. 2.

FIG. 5 is a perspective view of the gasket 130 in FIG. 2. Each side of the gasket 130 has a set of grooves G and protrusions P to fit the first set of grooves G and protrusions P in the first connecting surface 115 of the first terminal 114 shown in FIG. 3, and the second set of grooves and protrusions in the second connecting surface 125 of the second terminal 124 shown in FIG. 4, respectively. In a preferred embodiment, the grooves and protrusions of all sets are concentrically circular.

Figure 6:
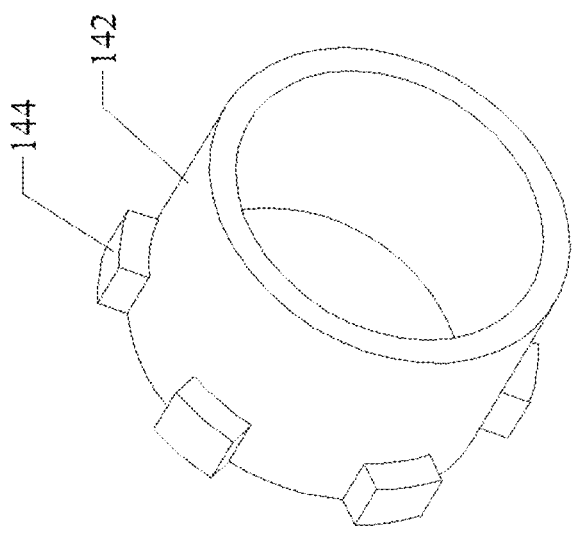
FIG. 6 is a perspective view of a hushing in FIG. 2.

FIG. 6 is a perspective view of the bushing 140 in FIG. 2. The bushing 140 contains and holds the second pipe 120 as shown in FIG. 1. An outer wall 142 of the bushing 140 has outward teeth 144. There are gaps between the outward teeth 144, and the outward teeth 144 are positioned around the bushing 140.

Figure 7:
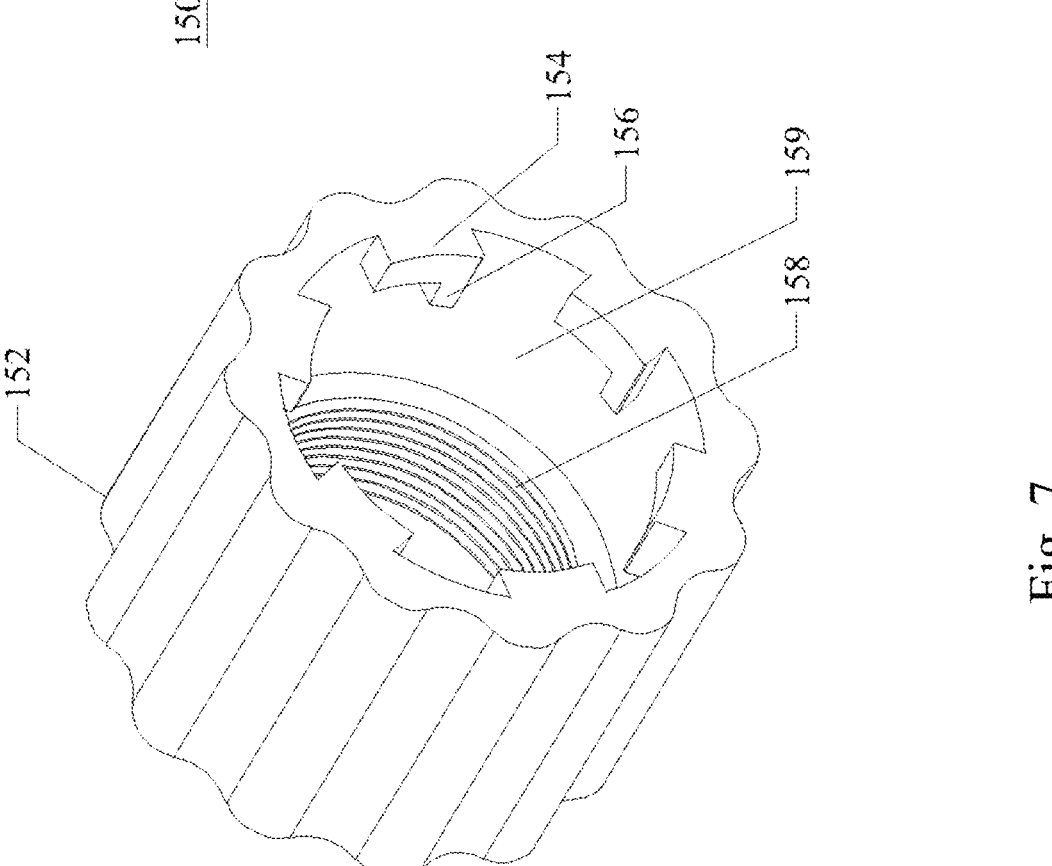
FIG. 7 is a perspective view of a sleeve in FIG. 2.

FIG. 7 is a perspective view of the sleeve 150 in FIG. 2. The sleeve 150 contains and holds the first pipe 110 and the bushing 140. An inner wall of the sleeve 150 has a thread in a first end 158 and inward teeth 154 in a second end 159. There are gaps between the inward teeth 154, and the inward teeth 154 are positioned around the axis of the sleeve 150.

The outward teeth 144 of the bushing 140 are smaller than gaps of the inward teeth 154 of the sleeve 150, and the inward teeth 154 of the sleeve 150 are smaller than gaps of the outward teeth 144 of the bushing 140. Such configuration allows the outward teeth 144 of the bushing 140 pass the inward teeth 154 of the sleeve 150 while the bushing 140 moves along the axis of the sleeve 150.

The outward teeth 144 of the bushing 140 is positioned between the inward teeth 154 of the sleeve 150. While the second terminal 124 and the outward teeth 144 of the bushing 140 is aligned with the inward teeth 154 of the sleeve 150, the inward teeth 154 of the sleeve 150 stop the outward teeth 144 of the bushing 140 from escaping, and thus hold the bushing 140, which holds the second terminal 124 and thus the second pipe 120. On the contrary, while the second terminal 124 and the outward teeth 144 of the bushing 140 is rotated to be aligned with the gaps of the inward teeth 154 of the sleeve 150, the outward teeth 144 of the bushing 140 can be disengaged from the inward teeth 154 of the sleeve 150, and thus the bushing 140 with the second terminal 124 and the second pipe 120 can be disengaged from the sleeve 150. Optionally, the sleeve 150 has a texture on an outer wall 152 to provide friction to rotate the sleeve 150. Based on a preferred embodiment of the present disclosure, the texture can be protrusions.

Figure 8:
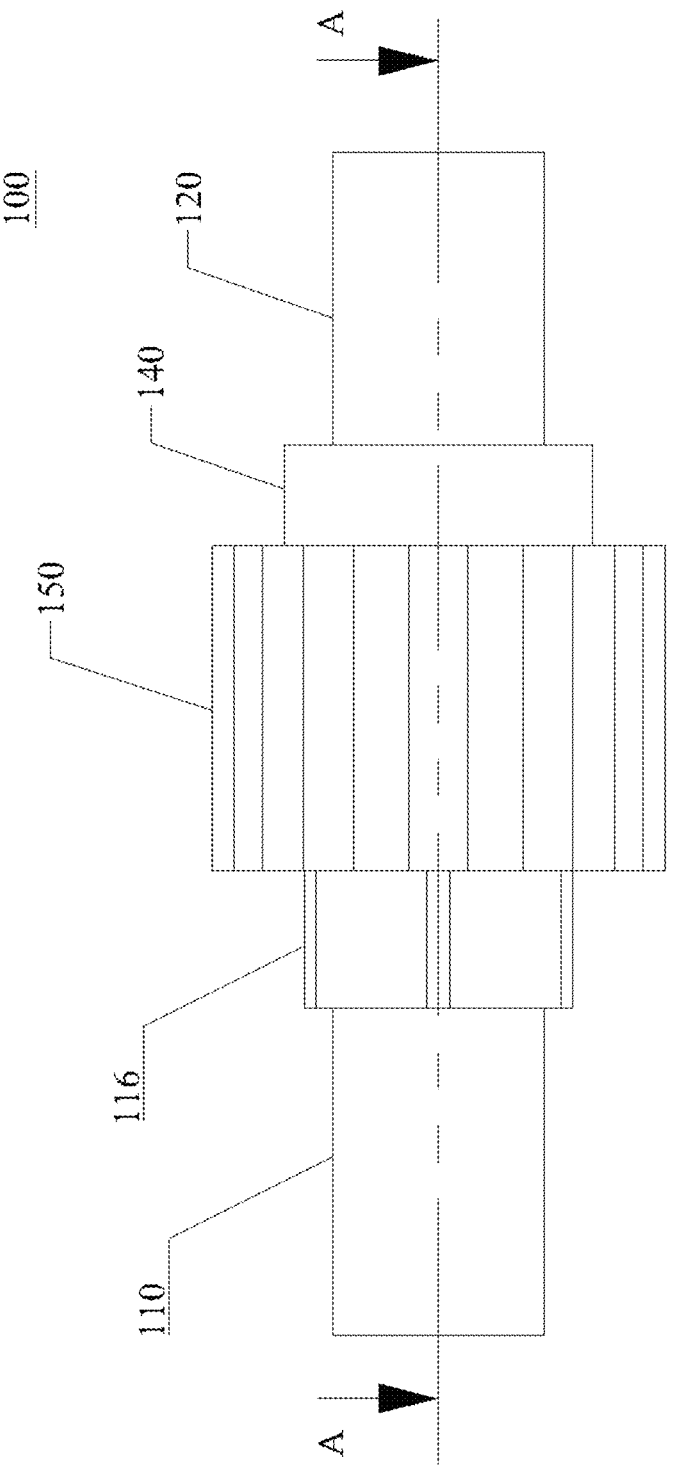
FIG. 8 is a side view of the assembly in FIG. 1 indicating a cross-section A-A.
Figure 9:
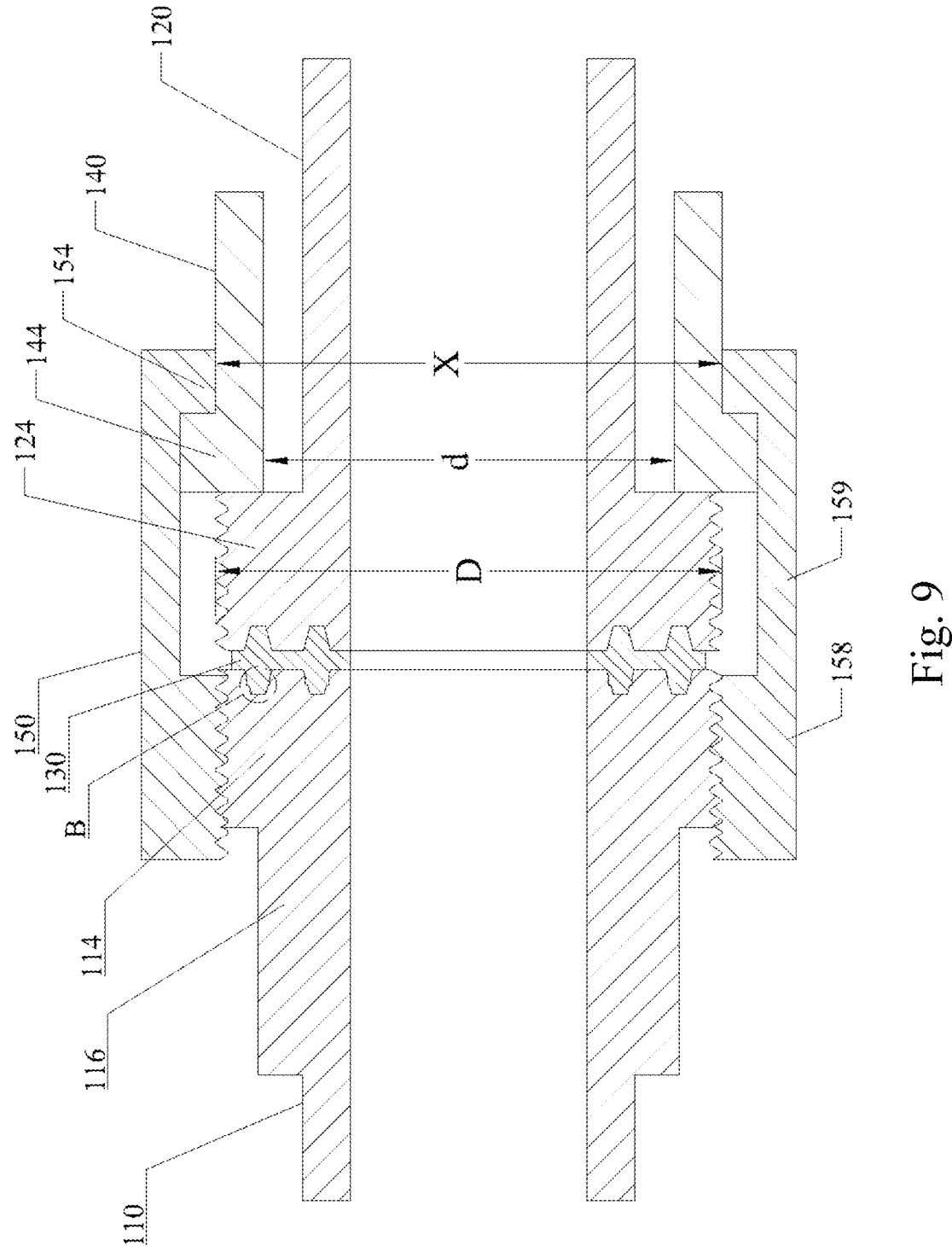
FIG. 9 is a cross-sectional view of the assembly in the cross-section A-A of FIG. 8.

FIG. 8 is a side view of the pipe joint assembly 100 in FIG. 1 indicating a cross-section A-A, and FIG. 9 is a cross-sectional view of the pipe joint assembly in the cross-section A-A of FIG. 8. The second end 159 of the sleeve 150 has a space to contain the second terminal 124 and the outward teeth 144 of the bushing 140. The inward teeth 154 of the sleeve 150 has an inner diameter X more than an outer diameter D of the second terminal 124 to allow the insertion of the second terminal 124. The bushing 140 has an inner diameter d less than the outer diameter D of the second terminal 124 to hold the second terminal 124 and retain the second pipe 120. Optionally, the inner diameter d of the bushing 140 can be enough to allow the insertion of the polygon section 116 because the second pipe 120 and the first pipe 110 are interchangeable. The first terminal 114 has a first set of grooves and protrusions on a first connecting surface. The second terminal 124 has a second set of grooves and protrusions on a second connecting surface. The gasket 130 has a third set of grooves and protrusions on a side to fit the first set of grooves and protrusions, and a fourth set of grooves and protrusions on another side to fit the second set of grooves and protrusions.

Figure 10:
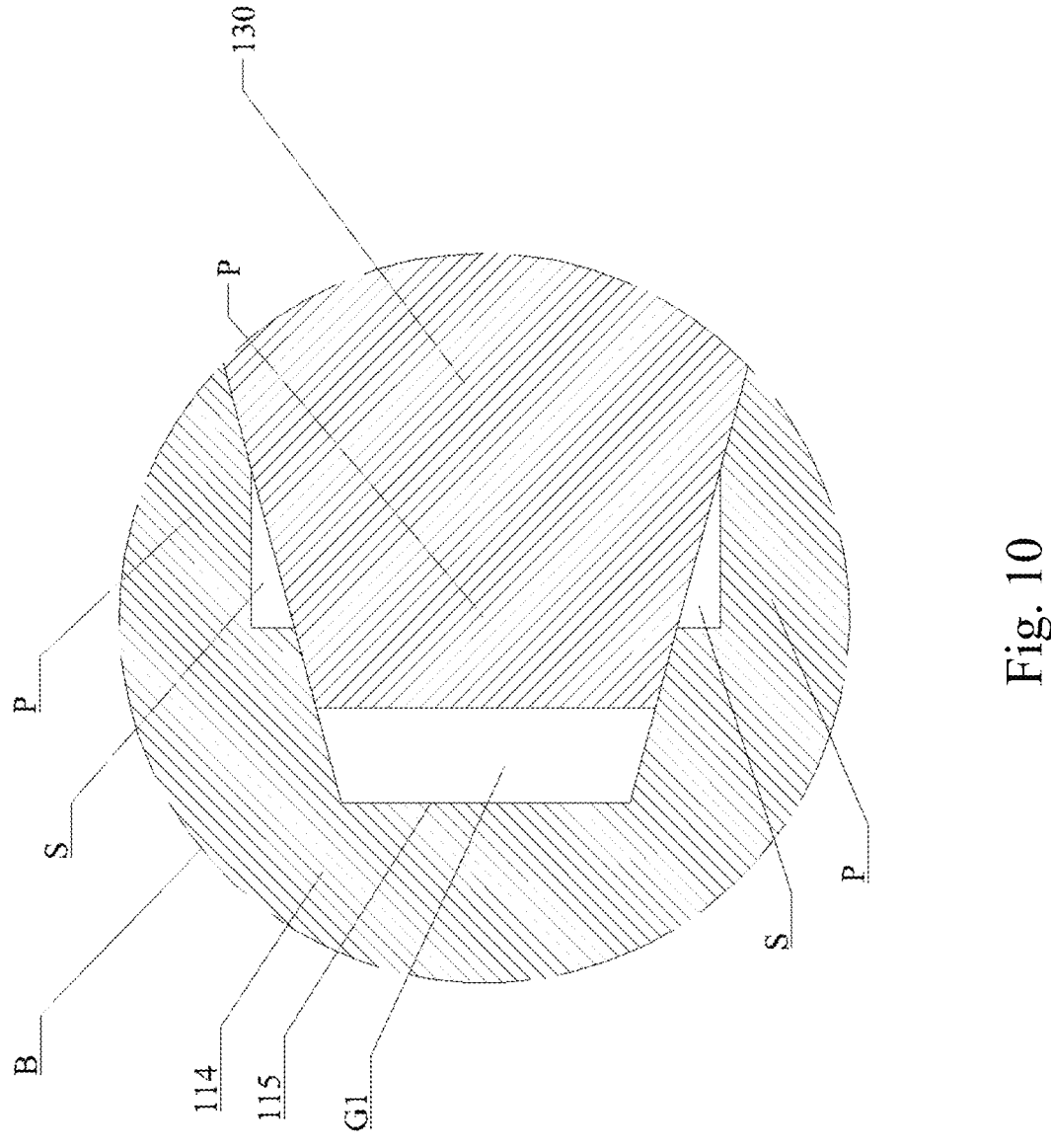
FIG. 10 is an enlarged view showing a detail structure in Area B of the cross-sectional view of the assembly of FIG. 9.

FIG. 10 is an enlarged view showing a detail structure in Area B of the cross-sectional view of the assembly of FIG. 9. FIG. 10 shows that the protrusions P of the first contact surface 115 of the first terminal 114 have notches to leave space S near the protrusion P of the gasket 130. The space S is compressed to generate the effect of the suction cups while the first terminal 114 is pushed to contact the gasket 130. Such notches can be in protrusions or grooves of the first terminal 114, the second terminal 124, or the gasket 130. Further, the cross section of a groove and a protrusion can be isosceles trapezoid, and such shape can easily create the airtight space G1 in a groove while a protrusion fits into a groove. The airtight space G1 can also generate the effect of the suction cups.

To sum up, the pipe joint assemblies described in the embodiments of the present disclosure allow connecting pipes in a direction perpendicular to the pipes because the bushing 140 and the sleeve 150 can be moved in a direction parallel to the pipes. Thus, the pipe joint assembly of the present disclosure solve the problem of the lack of space.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A pipe joint assembly comprising:
a gasket with a through hole, wherein the gasket is flexible;
a first pipe having a first terminal connecting the gasket;
a second pipe having a second terminal connecting the gasket;
a bushing containing and holding the second pipe; and
a sleeve containing and holding the first pipe and the bushing,
wherein the first terminal has a first set of grooves and protrusions on a first connecting surface;
the second terminal has a second set of grooves and protrusions on a second connecting surface; and
the gasket has a third set of grooves and protrusions on a side to fit the first set of grooves and protrusions, and a fourth set of grooves and protrusions on another side to fit the second set of grooves and protrusions,
wherein the grooves and protrusions of the first set, the second set, the third set, or the fourth set are concentrically circular.

2. The pipe joint assembly of claim 1, wherein an inner wall of the sleeve has a thread in a first end and inward teeth in a second end.

3. The pipe joint assembly of claim 2, wherein an outer wall of the bushing has outward teeth, the outward teeth are smaller than gaps of the inward teeth of the sleeve, and the second end of the sleeve has a space to contain the second terminal and the outward teeth of the bushing.

4. The pipe joint assembly of claim 3, wherein
an inner diameter the bushing is less than an outer diameter of the second terminal; and
an inner diameter of the inward teeth of the sleeve is more than the outer diameter of the second terminal.

5. The pipe joint assembly of claim 1, wherein the grooves or protrusions of the first set, the second set, the third set, or the fourth set have notches to leave space between the gasket and the first pipe or the second pipe.

6. The pipe joint assembly of claim 1, wherein cross-sections of the grooves and protrusions of the first set, the second set, the third set, and the fourth set are isosceles trapezoid.

7. The pipe joint assembly of claim 1, wherein the sleeve has a texture on an outer wall.

8. The pipe joint assembly of claim 1, wherein the first pipe has a polygonal section near the first terminal and the bushing has an inner diameter allowing insertion of the polygonal section.

9. A pipe joint assembly comprising:
a gasket with a through hole wherein the gasket is flexible;
a first pipe having a first terminal connecting the gasket;
a second pipe having a second terminal connecting the gasket;
a bushing containing and holding the second pipe; and
a sleeve containing and holding the first pipe and the bushing,
wherein the first terminal has a first set of grooves and protrusions on a first connecting surface;
the second terminal has a second set of grooves and protrusions on a second connecting surface;
the gasket has a third set of grooves and protrusions on a side to fit the first set of grooves and protrusions, and a fourth set of grooves and protrusions on another side to fit the second set of grooves and protrusions; and
cross-sections of the grooves and protrusions of the first set, the second set, the third set, and the fourth set are isosceles trapezoid.

10. The pipe joint assembly of claim 9, wherein the grooves and protrusions of the first set, the second set, the third set, or the fourth set are concentrically circular.

11. The pipe joint assembly of claim 9, wherein an inner wall of the sleeve has a thread in a first end and inward teeth in a second end, an outer wall of the bushing has outward teeth, the outward teeth are smaller than gaps of the inward teeth of the sleeve, and the second end of the sleeve has a space to contain the second terminal and the outward teeth of the bushing.

12. The pipe joint assembly of claim 11, wherein
the bushing has an inner diameter less than an outer diameter of the second terminal; and
an inner diameter of the inward teeth of the sleeve is more than the outer diameter of the second terminal.

13. The pipe joint assembly of claim 9, wherein the sleeve has a texture on an outer wall.

14. The pipe joint assembly of claim 9, wherein the first pipe has a polygonal section near the first terminal and the bushing has an inner diameter allowing insertion of the polygonal section.

15. A pipe joint assembly comprising:
a gasket with a through hole wherein the gasket is flexible;
a first pipe having a first terminal connecting the gasket;
a second pipe having a second terminal connecting the gasket;
a bushing containing and holding the second pipe; and
a sleeve containing and holding the first pipe and the bushing,
wherein the first terminal has a first set of grooves and protrusions on a first connecting surface;
the second terminal has a second set of grooves and protrusions on a second connecting surface; and
the gasket has a third set of grooves and protrusions on a side to fit the first set of grooves and protrusions, and a fourth set of grooves and protrusions on another side to fit the second set of grooves and protrusions,
wherein the grooves or protrusions of the first set, the second set, the third set, or the fourth set have notches to leave space between the gasket and the first pipe or the second pipe.

16. The pipe joint assembly of claim 15, wherein the grooves and protrusions of the first set, the second set, the third set, or the fourth set are concentrically circular.

17. The pipe joint assembly of claim 15, wherein an inner wall of the sleeve has a thread in a first end and inward teeth in a second end, an outer wall of the bushing has outward teeth, the outward teeth are smaller than gaps of the inward teeth of the sleeve, and the second end of the sleeve has a space to contain the second terminal and the outward teeth of the bushing.

* * * * *